United States Patent
O'Neill

(10) Patent No.: US 10,570,939 B2
(45) Date of Patent: Feb. 25, 2020

(54) RIVET

(71) Applicant: Redco NV, Kapelle-op-den-Bos (BE)

(72) Inventor: Bobby O'Neill, Glenmore (IE)

(73) Assignee: Etex Services NV, Kapelle-op-den-Bos (BE)

( * ) Notice: Subject to any disclaimer, the term of this patent is extended or adjusted under 35 U.S.C. 154(b) by 610 days.

(21) Appl. No.: 15/121,102

(22) PCT Filed: Feb. 17, 2015

(86) PCT No.: PCT/EP2015/053337
§ 371 (c)(1),
(2) Date: Aug. 24, 2016

(87) PCT Pub. No.: WO2015/128227
PCT Pub. Date: Sep. 3, 2015

(65) Prior Publication Data
US 2017/0067494 A1    Mar. 9, 2017

(30) Foreign Application Priority Data

Feb. 28, 2014    (EP) ..................................... 14157398

(51) Int. Cl.
*F16B 5/04*      (2006.01)
*F16B 19/06*     (2006.01)
*F16B 19/10*     (2006.01)

(52) U.S. Cl.
CPC ................ *F16B 5/04* (2013.01); *F16B 19/06* (2013.01); *F16B 19/10* (2013.01)

(58) Field of Classification Search
CPC .. Y10T 403/4933; Y10T 403/75; F16B 19/10; F16B 19/06; F16B 19/0225; F16B 5/04; F16B 19/1027; F16B 19/02; F16B 19/1054; F16B 5/025
USPC .............................................. 411/546, 41, 43
See application file for complete search history.

(56) References Cited

U.S. PATENT DOCUMENTS

| 3,687,496 A | * | 8/1972 | Hindin | .................... F16B 19/06 |
| | | | | 29/455.1 |
| 4,238,165 A | * | 12/1980 | Wagner | ................... F16B 39/26 |
| | | | | 403/408.1 |
| 4,352,589 A | * | 10/1982 | Allison | ..................... F16B 5/04 |
| | | | | 403/243 |

(Continued)

FOREIGN PATENT DOCUMENTS

EP      1 477 687 A1     11/2004

*Primary Examiner* — Matthew R Mcmahon
(74) *Attorney, Agent, or Firm* — Dilworth & Barrese, LLP

(57) ABSTRACT

A rivet (1) for fixing cementitious sheets to supports is provided, which rivet comprises a metal rivet body (10) with an axial length Lr, metal rivet head (12) and metal mandrel (14), characterized in that the rivet further comprises at least one polymer tubular member (20) having a length Lm in axial direction (30), Lm being less than Lr, said polymer tubular member being coaxially mounted on the rivet body along its length Lm. In addition, methods for fixing a cementitious sheet to a support by means of such rivets are provided as well as uses of such rivets in the building industry. Also, building systems, comprising a support and a cementitious sheet, which cementitious sheet is fixed to the support by means of at least one of the rivets of the invention is provided herein.

17 Claims, 3 Drawing Sheets

(56) References Cited

U.S. PATENT DOCUMENTS

| | | | |
|---|---|---|---|
| 4,587,377 A * | 5/1986 | Rodseth | H05K 7/20509 |
| | | | 174/138 G |
| 4,647,264 A * | 3/1987 | Pamer | F16B 19/1027 |
| | | | 24/94 |
| 4,659,268 A | 4/1987 | Del Mundo et al. | |
| 4,826,378 A * | 5/1989 | Pamer | F16B 19/04 |
| | | | 24/94 |
| 4,906,148 A * | 3/1990 | Schule | E04D 3/3603 |
| | | | 411/34 |
| 5,759,001 A * | 6/1998 | Smith | F16B 5/04 |
| | | | 411/34 |
| 6,582,172 B2 * | 6/2003 | Nickerson | F16B 5/02 |
| | | | 277/598 |
| 6,607,328 B1 | 8/2003 | Treiber et al. | |
| 7,261,489 B2 * | 8/2007 | Arbona | B62D 29/048 |
| | | | 403/381 |
| 7,384,226 B2 * | 6/2008 | Jones | F16B 19/1054 |
| | | | 411/43 |
| 8,220,222 B2 * | 7/2012 | Ciprian | B64C 1/06 |
| | | | 244/118.6 |
| 9,447,807 B2 * | 9/2016 | Brewer | F16B 19/1045 |
| 9,644,657 B2 * | 5/2017 | Pham | F16B 13/063 |
| 2013/0283597 A1 * | 10/2013 | Denslow | B21J 15/02 |
| | | | 29/524.1 |

\* cited by examiner

RIVET

FIELD OF THE INVENTION

The present invention relates to rivets, suitable for mounting cementitious objects, preferably sheets, to a support structure such as a metal frame.

BACKGROUND OF THE INVENTION

Fixing cementitious objects, e.g. fiber cement objects, such as fiber cement sheets, e.g. EQUITONE [Tectiva]® façade plates to a supporting structure, such as a metal or wooden frame, is known. Typically these façade plates are mounted and fixed to wooden frames by means of screw fixing. For metal frame support structures, screwing or riveting is used.

A difficulty is to have the cementitious objects, e.g. fiber cement objects, typically sheets, fixed to the support, while still allowing minor displacements of the fiber cement objects in at least 2, and sometimes 3 directions. Displacements in the two planar directions and perpendicular to the sheet surface are always to be foreseen. The displacements in planar direction of such sheets, in particular for fiber cement sheets, may be caused by hydric movement (expansion and shrinkage due to water absorption and desorption) and/or by carbonatation (carbonatation crimp). Displacements in the direction perpendicular to the sheet surface should in some cases be foreseen, and may be caused by minor bending of the sheet, or by displacement of the underlying support.

FIG. 1 shows a fiber cement sheet fixed to a metal frame as is known. As shown in FIG. 1, fiber cement sheets can be mechanically fixed to a metal frame by using shouldered rivets. The shoulder of the rivet, making an integral part of the metal rivet, ensures that the distance between the metal support and the outer face of the fiber cement sheet, facing away from the metal support, is kept substantially equal to the length of the shoulder. Some shoulders are wide enough to completely fill the drilling hole in the fiber cement sheet, thereby providing a so-called locked fixing. Some shoulders may have a width less then the diameter of the drilling hole, thereby allowing movement of the fiber cement sheet in the planar directions in view of the rivet. Optionally, metal sleeves are slide over rivets to cause the width of the rivet to match to the diameter of the drilling hole.

However, shouldered rivets are not only expensive to produce, but also may cause confusion for the craftsman when using two different types of shouldered rivets, one for locked fixing, the other for providing unlocked fixing points. This because these shouldered rivets may look very similar.

In case the option is taken to use rivets to provide unlocked fixing points combined with an additional metal sleeve for locked fixing points, the occasional addition of the metal sleeve may easily be forgotten during periods of repetitive action of inserting and closing rivets for providing fixing points.

When metal sleeves only are used to accommodate the width of the rivet for locked fixing points, the metal nature of the sleeve may cause damage to the drilled hole or additional stress may be enforced to the sheet at these holes, when the rivet is not perfectly perpendicularly inserted in the drilled hole. To force the optionally shouldered rivet with additional metal sleeve in the drilled hole, a significant force is needed to insert and install this rivet causing an increased risk for damaging the sheet surface.

SUMMARY OF THE INVENTION

It is an object of the present invention to provide a rivet which overcomes some or all of the above mentioned disadvantages.

According to a first aspect of the present invention, a rivet is provided, the rivet comprising a metal rivet body with an axial length Lr, metal rivet head and metal mandrel, characterized in that the rivet further comprises at least one polymer tubular member having a length Lm in axial direction, Lm being less than Lr, the polymer tubular member being coaxially mounted on the rivet body along its length Lm.

The term "sleeve" refers to a hollow tubular part designed to fit over another part, such as over another tubular part.

The tubular member is a hollow rigid tubular part, designed to fit over another part. Rigid means that the member does not easily change in dimensions under forces applicable for the intended use.

According to some embodiments, the polymer tubular member may be a polymer selected from the group consisting of polyamide, polyester, polyvinylchloride, polypropylene, polyethylene and copolymers thereof.

The polymer tubular member may be provided out of various polymeric materials, as e.g. polyamide (often referred to as PA or nylon) such as polyamide 6, polyamide 6.6, polyamide 6.10, polyamide 12, polyester, polyvinylchloride, polypropylene, polyethylene, or copolymers comprising corresponding monomers of the above mentioned polymers. Preferably polyamide is used.

The metal rivet typically has several metal parts such as a metal body, including a metal tenon, a metal rivet head and metal mandrel. The metal parts of the rivet, including the metal body, metal head and metal mandrel, are usually provided as one unit and preferably provided out of aluminum or aluminum alloys, such as AlMg5 grade aluminum alloy, steel or stainless steels such as stainless steel type A2 or A4 grade. Most preferably, the metal parts of the rivet are provided out of aluminum alloys or stainless steels.

The head of the rivet may be provided with a coating at least at the surface of the head which will be exposed coplanar with the cementitious object, such as fiber cement sheet. The coating may typically be a colored coating, having a similar of identical color as the color of the outer surface of the sheet or object with which this head is coplanar.

According to some embodiments, the length of the rivet body Lr may be more than or equal to about 17 mm (i.e. about 17.0 mm) and less than or equal to about 26 mm (i.e. about 26.0 mm).

More preferably, the length of the rivet body Lr is equal than or more than about 18 mm (i.e. about 18.0 mm), and less than or equal to about 25 mm (i.e. about 25.0 mm). The clamping length of the rivet is preferably in the range of more than or equal to about 8 mm (i.e. about 8.0 mm) and less than or equal to about 18 mm (i.e. about 18.0 mm).

According to some embodiments, the rivet body may have an equal diameter along its length Lr.

The metal parts of the rivet hence together preferably provide a non shouldered rivet body.

According to some embodiments, the length of the polymer tubular member (Lm) may be more than or equal to about 10 mm (i.e. about 10.0 mm) and less than or equal to about 15 mm (i.e. about 15.0 mm).

The length to the polymer tubular member is typically about 1.5 mm to about 3 mm (i.e. about 3.0 mm) larger as compared to the thickness of the building board or sheet which it to be mounted using the rivet according to the invention, and typically are about 2 mm larger.

More preferably, the length of the polymer tubular member is more than or equal to about 10 mm (i.e. about 10.0 mm), such as for fixing cementitious sheets having a thickness of about 8 mm.

More preferably, the length of the polymer tubular member is more than or equal to about 12 mm (i.e. about 12.0 mm), such as for fixing cementitious sheets having a thickness of about 10 mm.

More preferably, the length of the polymer tubular member is more than or equal to about 14 mm (i.e. about 14.0 mm), such as for fixing cementitious sheets having a thickness of about 12 mm.

According to some embodiments, the polymer tubular member may have a wall thickness (Dw) of more than or equal to 1 mm and less than or equal to about 8 mm (i.e. about 8.0 mm).

More preferably, the wall thickness of the polymer tubular member is more than or equal to about 1.2 mm, and less than or equal to about 7 mm (i.e. about 7.0 mm), even less than or equal to about 6 mm (i.e. about 6.0 mm). A wall thickness of between about 1.5 mm and about 2.75 mm may be applied.

According to some embodiments, the inner diameter of the opening of the polymer tubular member (Dm) may be more than or equal to about 4 mm (i.e. about 4.0 mm) and less than or equal to about 5.5 mm.

More preferably, the inner diameter of the opening of the polymer tubular member is more than or equal to 4.1 mm, even more than or equal to about 4.2 mm and less than or equal to about 5 mm (i.e. about 5.0 mm), even less than or equal to about 4.9 mm.

According to some embodiments, the maximum diameter of the metal body of the rivet may be between about 1.0 and about 1.1 times the diameter of the polymer tubular member.

Typically, the difference in diameter of the metal body of the rivet and the one of the polymer tubular member is about 0.05 mm to about 0.25 mm, such as between about 0.1 mm and about 0.15 mm, inclusive.

Most preferably, the rivet body has a substantially uniform diameter along its length.

The diameter of the rivet body may be more than or equal to about 3.75 mm, even more than or equal to 4 mm and less than or equal to 5 mm, even less than or equal to about 4.9 mm. The diameter of the rivet body may typically be about 4.0 or 4.8 mm.

Optionally, the polymer tubular member (i.e. the sleeve) tightly fits around and adheres to the rivet body in a way that under normal conditions, the polymer tubular member will not displace in view of the rivet body. Most preferably, the diameter of the rivet body is not fixed to the sleeve in any other way. Optionally, the polymer tubular member and the rivet body may be fixed to each other by an adhesive or alike.

The polymer tubular members may be provided with any feasible colour. The sleeves may be extruded polymer tubular members or tubes.

According to some embodiments, a second and optionally further tubular members may be coaxially mounted on the at least first polymer tubular member.

The inner diameter of the second tubular member may be substantially identical or slightly larger than the outer diameter of the first polymer tubular member, e.g. the ratio of inner diameter of the second tubular member and the outer diameter of the first polymer tubular member may vary from about 1.0 to about 1.1.

In case of m further tubular members, m more than 1, for each figure between 2 and m, the inner diameter of the $n^{th}$ further tubular member may be substantially identical or slightly larger than the outer diameter of the $n-1^{th}$ further tubular member, e.g. the ratio of inner diameter of the $n^{th}$ further tubular member and the outer diameter of the $n-1^{th}$ further tubular member may vary from about 1.0 to about 1.1.

The second and optionally further tubular members are preferably polymeric, such as is the case for the at least first polymer tubular member. In the alternative at least the outer second or further tubular member is provided out of metal, such as aluminum or aluminum alloys, such as AlMg5 grade aluminum alloy, steel or stainless steels such as stainless steel type A2 or A4 grade. Most preferably these tubular members are provided from aluminum alloys or stainless steels.

The rivets according to the first aspect of the present invention may be used to fix cementitious sheets, sometimes referred to cementitious boards or plates, to a support. Preferably the cementitious sheets are fiber cement sheets.

According to a second aspect of the present invention, a method for fixing a cementitious sheet to a support is provided, the method, comprising the steps of Providing a support;
Providing a cementitious sheet;
providing at least one hole in said sheet;
providing a hole in the support;
fixing the cementitious sheet to the support by inserting a rivet according to the first aspect of the invention, having the length of the polymer tubular member being at least identical or longer than the thickness of the cementitious sheet, into the at least one hole in the sheet and the at least one hole in the support;
constrict the rivet, thereby fixing the cementitious sheet to the support.

In particular embodiments, the present invention provides methods for fixing a cementitious sheet to a support, at least comprising the steps of:
(i) providing a support;
(ii) providing a cementitious sheet;
(iii) providing at least one hole in said sheet;
(iv) providing at least one hole in said support;
(v) fixing said cementitious sheet to said support by inserting a rivet (1) into the at least one hole in said sheet and into the at least one hole in said support, said rivet (1) comprising: a metal rivet body (10) with an axial length Lr, a metal rivet head (12), a metal mandrel (14)and at least one polymer tubular member (20) having a length Lm in axial direction (30), Lm being less than Lr, said polymer tubular member being coaxially mounted on said rivet body along its length Lm, and
constricting the rivet, thereby fixing the cementitious sheet to the support, characterized in that:
said length Lm of said polymer tubular member is at least identical or longer than the thickness of said cementitious sheet, and the outer diameter of said polymer tubular member is larger than the outer diameter of the at least one hole in said support.

In these particular embodiments, a fixed distance is created between the cementitious sheet and the support by means of the polymer tubular member, which fixed distance is equal to the difference between the length of the polymer tubular member and the thickness of the cementitious sheet.

Creating such a distance between the sheet and the support allows the occurrence of minor displacements, such as movements, bendings or expansions of the cementitious sheet, e.g. the fiber cement sheet, in the direction perpendicular to the sheet, without any further undesirable consequences.

In particular embodiments, the diameter of the hole in the cementitious sheet, e.g. the fiber cement sheet, is greater (i.e. wider) than the diameter of the hole in the support.

In certain particular embodiments, the length of the polymer tubular member (Lm) is more than or equal to about 10 mm (i.e. about 10.0 mm) and less than or equal to about 15 mm (i.e. about 15.0 mm).

In certain further particular embodiments, the length of said polymer tubular member is typically about 1.5 mm to about 3 mm larger as the thickness of said cementitious sheet.

In particular embodiments, the present invention provides methods for fixing a cementitious sheet to a support, further comprising the step of providing at least one damping sheet-like object adjacent to the at least one hole in said support, said damping sheet-like object having a thickness T. In these particular embodiments, the thickness T of said damping sheet-like object is equal to or greater than the difference between the length Lm of said polymer tubular member and the thickness of said cementitious sheet. In yet further particular embodiments, the at least one damping sheet-like object is damping ring or a damping strip made out of compressible material, such as a foam-like material, for instance but not limited to poly-urethane.

In particular embodiments, the present invention provides methods for fixing a cementitious sheet to a support, wherein n pairs of holes are provided, n being an integer equal or more than 2, each pair having one hole in the cementitious sheet, and a corresponding hole in the support, said steps of fixing and constricting comprise insertion of and constriction of n rivets, as defined herein, into said n pairs of holes, wherein m rivets have a maximum outer diameter being substantially equal to the diameter of the hole in the cementitious sheet, and wherein n-m rivets have a maximum outer diameter smaller than the diameter of the hole in the cementitious sheet.

In particular embodiments, the present invention provides methods for fixing a cementitious sheet to a support, wherein said polymer tubular member is made of a polymer selected from the group consisting of polyamide, polyester, polyvinylchloride, polypropylene, polyethylene and copolymers thereof.

In yet further particular embodiments, the present invention provides methods for fixing a cementitious sheet to a support, wherein said polymer tubular member has a wall thickness (Dw) of more than or equal to about 1 mm and less than or equal to about 8 mm (i.e. about 8.0 mm). In still further particular embodiments, the inner diameter of the opening of the polymer tubular member (Dm) is more than or equal to about 4 mm and less than or equal to about 5.5 mm.

In particular embodiments, the present invention provides methods for fixing a cementitious sheet to a support, wherein a second and optionally further polymer tubular members are coaxially mounted onto said at least first polymer tubular member.

In particular embodiments, the present invention provides methods for fixing a cementitious sheet to a support, wherein said cementitious sheet is a fiber cement sheet.

In a third aspect, the present invention provides uses of a rivet (1) for fixing a cementitious sheet, in particular a fiber cement sheet, to a support, said rivet (1) comprising:
a metal rivet body (10) with an axial length Lr, a metal rivet head (12), a metal mandrel (14) and at least one polymer tubular member (20) having a length Lm in axial direction (30), Lm being less than Lr, said polymer tubular member being coaxially mounted on said rivet body along its length Lm, characterized in that:
said length Lm of said polymer tubular member is at least identical or longer than the thickness of said cementitious sheet, and the outer diameter of said polymer tubular member is larger than the outer diameter of the at least one hole in said support.

In a fourth aspect, the present invention provides building systems, at least comprising:
a support and a cementitious sheet, which cementitious sheet is fixed to said support by means of at least one rivet (1), which rivet is inserted into at least one hole in said sheet and into at least one hole in said support, said rivet (1) comprising:
a metal rivet body (10) with an axial length Lr, a metal rivet head (12), a metal mandrel (14) and at least one polymer tubular member (20) having a length Lm in axial direction (30), Lm being less than Lr, said polymer tubular member being coaxially mounted on said rivet body along its length Lm, characterized in that: said length Lm of said polymer tubular member is at least identical or longer than the thickness of said cementitious sheet, and the outer diameter of said polymer tubular member is larger than the outer diameter of the at least one hole in said support.

In particular embodiments, the building systems according to the invention further comprise at least one damping sheet-like object adjacent to the at least one hole in said support, said damping sheet-like object having a thickness T, which is equal to or greater than the difference between the length Lm of said polymer tubular member and the thickness of said cementitious sheet.

The cementitious sheet for use in the context of the present invention is preferably a fiber cement sheet. The rivets according to the present invention may also be used to fix high pressure laminate board (HPL boards) to a support in substantially the same way.

Typically, the holes for inserting the rivets into the cementitious sheet and into the support are provided by drilling a hole into the cementitious sheet, e.g. the fiber cement sheet, and into the support, typically a metal support, like a metal frame. In particular embodiments, the diameter of the hole in the cementitious sheet, e.g. the fiber cement sheet is wider than the hole in the support. in particular embodiments, the maximum outer diameter of the polymer tubular member is larger than the diameter of the hole in the support, to ensure that the polymer tubular member sets the distance between the support and the surface of the cementitious sheet, e.g. the fiber cement sheet, facing away from the support, which surface contacts the head of the rivet.

Typically, the diameter of the hole in the cementitious sheet is in the range of about 8 mm (i.e. about 8.0 mm) to 15 mm (i.e. about 15.0 mm), more typically in the range of about 10 mm (i.e. about 10.0 mm) to about 12.5 mm, such as about 11 mm (i.e. about 11.0 mm).

The drilled holes in the support, typically a metal frame support, are coaxially arranged with the drilled holes in the cementitious sheet, and typically range in diameter from about 3.5 mm to about 5.5 mm, such as between about 4 mm (i.e. 4.0 mm) and about 5 mm (i.e. about 5.0 mm), e.g. about 4.1 mm and about 4.9 mm.

Typically, the difference of diameter between drilled hole in the support and the diameter of the rivet body is about 0.1 mm, i.e. the diameter of the drilled hole is 0.1 mm wider than the diameter of the body of the rivet. As an example, a rivet with rivet body diameter of 4 mm is used when the diameter of the drilled hole in the support is about 4.1 mm; a rivet with rivet body diameter of about 4.8 mm is used when the diameter of the drilled hole in the support is 4.9 mm.

According to some embodiments, the methods of the invention may further comprise the provision of a damping sheet-like object adjacent to the at least one hole in the support, the damping sheet-like object having a thickness T.

This damping sheet-like object may be a damping ring or a damping strip, typically provided out of compressible material such as e.g. foam, such as polyurethane foam.

According to some embodiments, the damping sheet-like object may have a thickness T being equal or more than the difference between the length of the polymer tubular member and the thickness of the cementitious sheet.

According to some embodiments, n pairs of holes may be provided, n being an integer equal or more than 2. Each pair has one hole in the cementitious sheet, and a corresponding hole in the support. The steps of fixing and constricting comprises the insertion of and constriction of n rivets according to the first aspect of the invention, into the n pairs of holes, wherein
- m rivets having its maximum outer diameter being substantially equal to the diameter of the hole in the cementitious sheet,
- n-m for rivets having its maximum outer diameter smaller than the diameter of the hole in the cementitious sheet.

The outer diameter of the rivet—typically being the outer diameter of the polymer tubular member or the outer tubular member—being "substantially equal" to the diameter of the hole in the cementitious sheet is to be understood as is there a tolerance of 0 to about 0.1 mm, such as from 0 to 0.1 mm.

The outer diameter of the rivet—typically being the outer diameter of the polymer tubular member or the outer tubular member—being "smaller" than the diameter of the hole in the cementitious sheet" is to be understood as that there is a difference in diameter of more than about 0.1 mm, typically more than about 0.2 mm. The difference in diameter is preferably less than about 1.0 mm, e.g. less than about 0.75 mm, such as equal or less than about 0.5 mm.

The rivet with the maximum outer diameter being larger than the diameter of the hole in the support and substantially equal to the diameter of the hole in the cementitious sheet, e.g. the fiber cement sheet will provide a so called "locked" fixing point. The cementitious sheet, e.g. the fiber cement sheet will not be able to move in planar directions versus the support. The other rivets with maximum outer diameter being larger than the diameter of the hole in the support and significantly smaller than the diameter of the hole in the cementitious sheet, e.g. the fiber cement sheet will provide a so called "gliding" fixing point. The cementitious sheet, e.g. the fiber cement sheet will be able to move in planar directions versus the support. The combination of only one or a few locked fixing points with other gliding fixing points, enable the cementitious sheet, e.g. the fiber cement sheet to be permanently fixed to the support, while still allowing the cementitious sheet, e.g. the fiber cement sheet to expand and shrink in planar directions.

Preferably, the sleeves of the two different rivets according to the invention used, have a different color to be clearly distinguishable when used by the skilled person.

In alternative embodiments, the m rivets having its maximum outer diameter being substantially equal to the diameter of the hole in the cementitious sheet, e.g. the fiber cement sheet, comprise a rivet having a first polymer tubular member, over which a second tubular member, from metal or polymer, is mount.

With regard to the number of rivets used, this may depend on the dimensions (length, width, thickness, weight and alike) of the cementitious object, such as cementitious sheet. Typically n is at least 3, but can be more, even 18 or 24, in particular when the cementitious sheets have dimensions of about 1.25 meter by about 2.5 meter or even about 3.1 meter.

According to some embodiments, m may equal 2.

Typically, the m fixing points using rivets having its maximum outer diameter being substantially equal to the diameter of the hole in the cementitious sheet, are all fixed to a different support element in the support, and typically only 2 such points are provided, being fixed to adjacent support elements if the support.

According to a fifth aspect of the invention, a rivet according to the present invention is used for fixing a cementitious sheet to a support. The cementitious sheet is preferably a fiber cement sheet.

According to an embodiment, the rivets may be used for fixing cementitious sheets to a support, the support being a metal framework.

Preferably the support is a metal frame, typically made out of steel, stainless steel, galvanized steel, aluminum or aluminum alloys and alike.

The rivets according to the present invention are preferably used to fix fiber cement sheets to a frame. Fiber cement sheets or products are well known in the art. The fiber cement sheets are made out of fiber cement slurry, which is formed in a so-called green fiber cement product, and cured.

Dependent to some extent on the curing process used, the fiber cement slurry typically comprises water, process and/or reinforcing fibers which both may be natural organic fibers (typically cellulose fibers) or synthetic organic and/or inorganic fibers (glass, polyvynilalcohol, polyacrilonitrile, polypropylene, polyamide, polyester, polycarbonate, polyethylene, etc.), cement e.g. Portland cement, limestone, chalk, quick lime, slaked or hydrated lime, ground sand, silica sand flour, quartz flour, amorphous silica, condensed silica fume, microsilica, kaolin, metakaolin, wollastonite, mica, perlite, vermiculite, aluminum hydroxide, slag, pigments, antifoaming agents, flocculants, and other additives. Optionally a color additive (e.g. pigments) are added, to obtain a fiber cement product which is so-called colored in the mass.

The green fiber cement sheet is cured, typically by curing to the air (air cured fiber cement products) or under pressure in presence of steam and increased temperature (autoclave cured). For autoclave cured products, typically sand is added in the fiber cement slurry. The autoclave curing typically results in the presence of 11.3 Å (angstrom) Tobermorite in the fiber cement sheet.

Fiber cement sheets, also referred to as fiber cement sheets or fiber cement panels, usually are made using the well known Hatschek-process, flow-on process or Magnani-process, or combinations thereof.

The fiber cement sheet may be obtained by first providing a green fiber cement sheet, which is subjected to compression, before curing, i.e. by air curing or autoclave curing.

The "green" fiber cement sheet, after being made by the Hatschek-process, may be first pre-cured to the air, after which the pre cured board is further air cured until it has its final strength, or autoclave cured using pressure and steam, to give the sheet its final properties.

Typical properties are thicknesses of the sheet, which may vary from 4 mm to 20 mm, such as from 7.0 mm to 13.0 mm.

The density of the sheets may vary from 0.5 kg/dm³ to 2.2 kg/dm³, such as from 0.6 kg/dm³ to 2.0 kg/dm³. The dimensions of the sheet, next to the thickness, may vary from about 1 meter to about 1.7 meter in width and 1 meter to 3.6 meter in length. Alternatively, also smaller dimensions may be used, e.g. substantially square sheets from 30 by 30 cm up to 100 by 100 cm, e.g. 40 by 40 cm, 60 by 60 cm or 90 by 90 cm.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 3a to 3c are schematic views of various rivets according to the present invention, used to fix a fiber cement sheet to a metal structure.

Figures 1A, 1B, 1C, 1D:
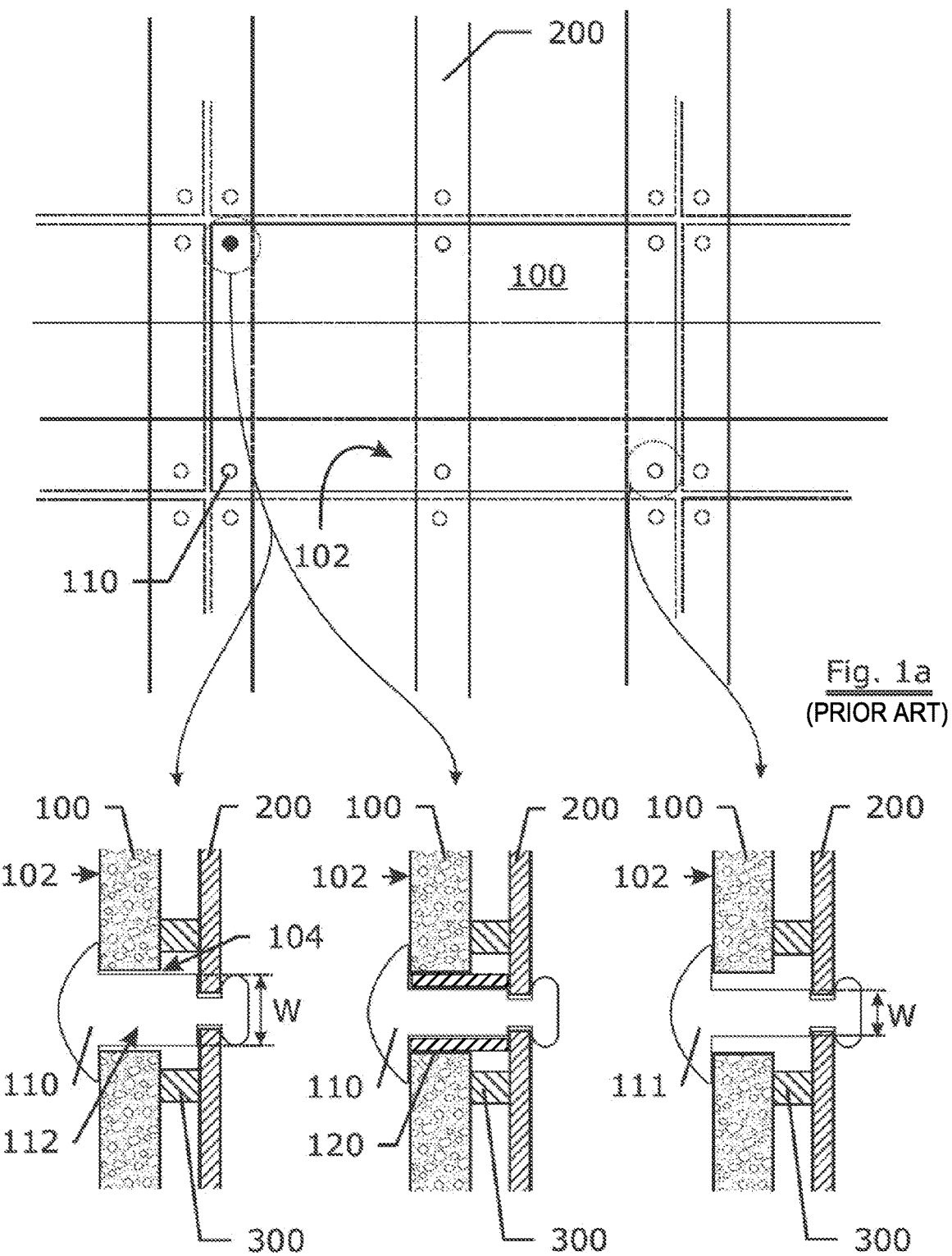
FIG. 1a to 1d are schematic views of various rivets used to fix a fiber cement sheet to a metal structure.

The same reference signs refer to the same, similar or analogous elements in the different figures.

DESCRIPTION OF ILLUSTRATIVE EMBODIMENTS

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B. The terms "comprising", "comprises" and "comprised of" as used herein are therefore synonymous with "including", "includes" or "containing", "contains", and are inclusive or open-ended and do not exclude additional, non-recited members, elements or method steps.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

As used herein, the singular forms "a", "an", and "the" include both singular and plural referents unless the context clearly dictates otherwise.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

A "(fiber cement) sheet" as used herein, also referred to as a panel or a plate, is to be understood as a flat, usually rectangular element, a fiber cement panel or fiber cement sheet being provided out of fiber cement material. The panel or sheet has two main faces or surfaces, being the surfaces with the largest surface area. The sheet can be used to provide an outer surface to walls, both internal as well as external a building or construction, e.g. as façade plate, siding, etc.

A known way, known in the art, to fix a cementitious sheet, e.g. a fiber cement sheet 100 to a support, here a metal frame 200 is shown in FIG. 1a. The fiber cement sheet 100 is mechanically fixed to a metal frame 200 by using shouldered rivets 110. Between the surface of the fiber cement sheet facing towards the metal frame, a soft polyurethane foam strip 300 is applied. The shoulder 112 of the rivet, making an integral part of the metal rivet, ensures that the distance between the metal support 200 and the outer face 102 of the fiber cement sheet, facing away from the metal support, is kept substantially equal to the length of the shoulder. In FIG. 1b, being a detail of FIG. 1a, where a so called locked fixing point is provided, the shoulders width W is wide enough to completely fill the drilling hole 104 in the fiber cement sheet, thereby providing a so-called locked fixing or locked fixing point. Optionally, as shown in FIG. 1c, being an alternative detail of FIG. 1a, metal sleeves 120 are slide over shouldered rivets to cause the width of the rivet to match to the diameter of the drilling hole.

As in FIG. 1d, being a detail of FIG. 1a a normal rivet 111 or a shouldered rivet whose shoulder may have a width W less then the diameter of the drilling hole, may be used, thereby allowing movement of the fiber cement sheet in the planar directions in view of the rivet. These provide so called gliding, sliding or unlocked fixing points.

Figure 2:
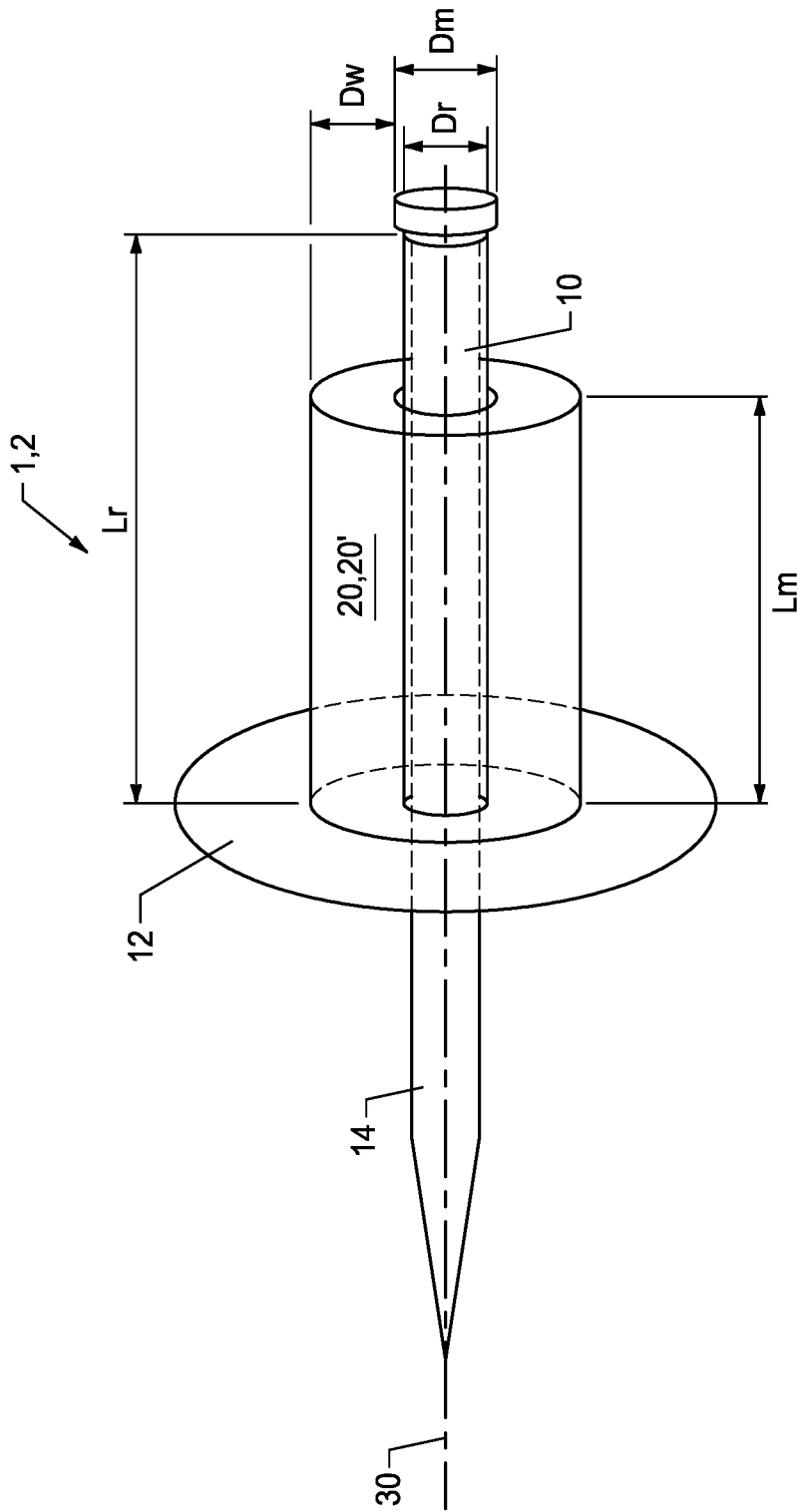
FIG. 2 schematically illustrates dimensions of a rivet according to the present invention.

A rivet 1 or 2 according to the invention is shown in FIG. 2. The rivet comprises a metal rivet body 10 with an axial length Lr, metal rivet head 12 and metal mandrel 14. The rivet further comprises a polymer tubular member 20 having a length Lm in axial direction 30 for which Lm being less than Lr. This tubular polymer tubular member is coaxially mounted on the rivet body along its length Lm.

In a first embodiment of rivet 1, the metal rivet parts are made from aluminum alloy, the rivet body has a length Lr of 20 mm and a substantially equal body diameter Dr of 4 mm. The head of the rivet has a diameter of about 15 mm. The polymer tubular member is a rigid polymer tube made out of polyamide, having a length, a substantially equal wall thickness Dw of 3.45 mm along its length Lm being 10.25 mm in axial direction 30. The inner open space of the sleeve 20 is substantially equal along the length Lm and is about 4.1 mm, preferably slightly more then Dr.

In a second embodiment—rivet 2—the metal rivet parts are made from aluminum alloy, the rivet body has a length Lr of 20 mm and a substantially equal body diameter Dr of 4 mm. The head of the rivet has a diameter of about 15 mm. The polymer tubular member is a rigid polymer tube made out of polyimide, having a substantially equal wall thickness Dw of 1.75 mm along its length Lm being 10.25 mm in axial direction 30. The inner open space of the sleeve 20 is substantially equal along the length Lm and is about 4.1 mm, preferably slightly more then Dr.

The color of the sleeve of the first embodiment is different than the color of the sleeve of the second embodiment. As noticed, the metal rivet parts are all identical.

In an alternative embodiment, the sleeve is made such that the diameter Dm and diameter Dr are identical. The sleeve, once mount on the rivet body, will be locked, though can be removed by exercising some force to pull the sleeve back off the body.

The rivets 1 and 2 are now used to mount a fiber cement sheet to a metal support, in an identical set up as in FIG. 1a, as shown in FIG. 3a.

The fiber cement sheet 100 is fixed to the metal support 200 using several fixing points, two fixing point being a locked fixing point 11, the other being gliding fixing points 21.

The fiber cement sheet 100 is of type Equitone [Tectiva] ®, available from Eternit NV, Belgium, and has dimensions of 3.1 m by 1.25 m, with a thickness of 8 mm and a weight of 14.9 kg/m². 18 fixing points 11 and 21 are provide, organized as shown in FIG. 3a. The points 21 are unlocked or gliding fixing points, the points 11 are locked fixing points.

Holes, with a diameter of 11 mm in this embodiment, are drilled in the fiber cement sheet at the positions of the fixing points 11 and 21. To provide the fixing points 11 and 21, the fiber cement sheet 100, with the drilled holes, is first positioned against the support frame 200, which has been provided with the soft polyurethane foam strip 300. First the fixed points 11 are made. Using a centralizing tool, a hole is drilled in the metal frame 200 at each positions of a fixed or locked fixing points 11, which hole is 4.1 mm in diameter. In these holes the rivets of type 1 are inserted and closed (also referred as popped). The sleeves 20 of these rivets 1 will fit tightly in the drilled holes, and cause the rivet and the fiber cement sheet not to be able to move relative one to the other.

Thereafter, the other unlocked or sliding fixing points are provided. Similarly, using a centralizing tool, a hole is drilled in the metal frame 200 at each positions of a gliding fixing points 11, which hole is 4.1 mm in diameter. In these holes the rivets of type 2 are inserted and popped. The sleeves 20 of these rivets 2 do not fill the drilled holes 11, and cause the fiber cement sheet to be able to move in the planar directions as compared to the rivets 2.

The head 12 of the rivets 1 and 2, having a diameter of 15 mm cover the complete drilling holes 11.

Figure 3B:
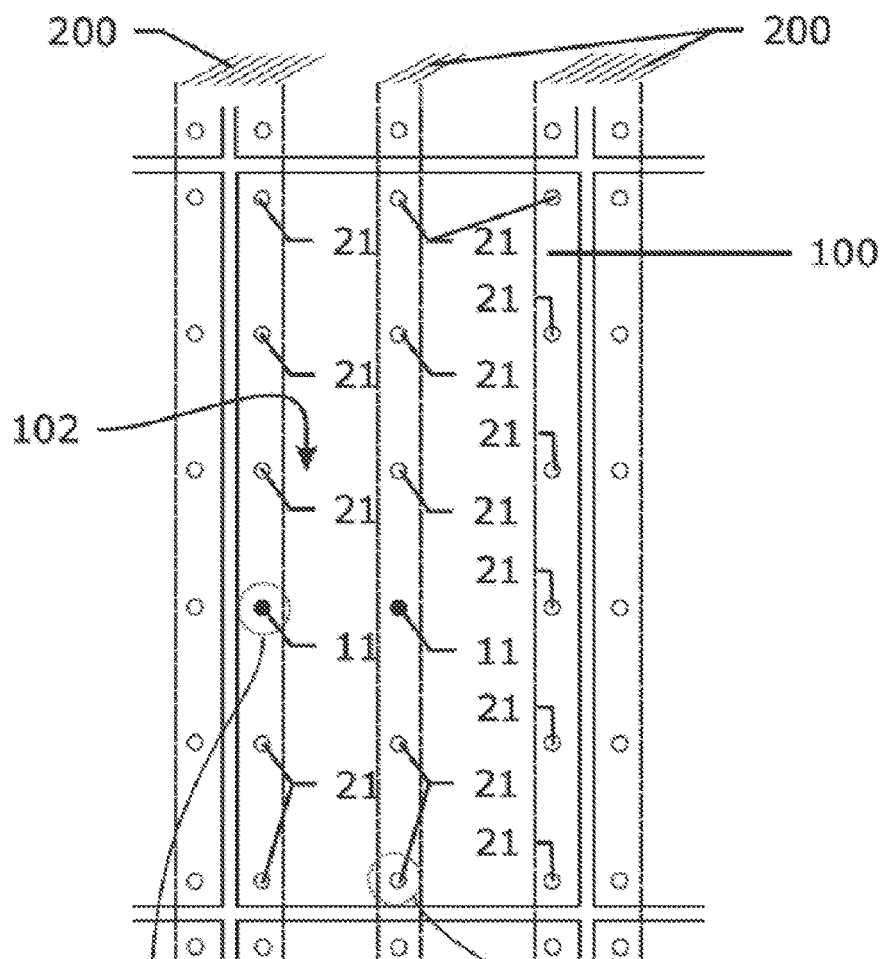

As shown in FIG. 3b, being a detail of the locked fixing point 11, the rivet 1 is used having a sleeve 20 which fits narrowly in the drilled hole on the fiber cement sheet. The metal body of the rivet has a diameter equal or slightly less than the drilled hole in the metal support. As the sleeve fills the drilled hole on the fiber cement sheet, the fiber cement sheet will on point 11 be prevented to change position in view of the metal frame in directions planar to the surface of the fiber cement sheet.

Figure 3C:
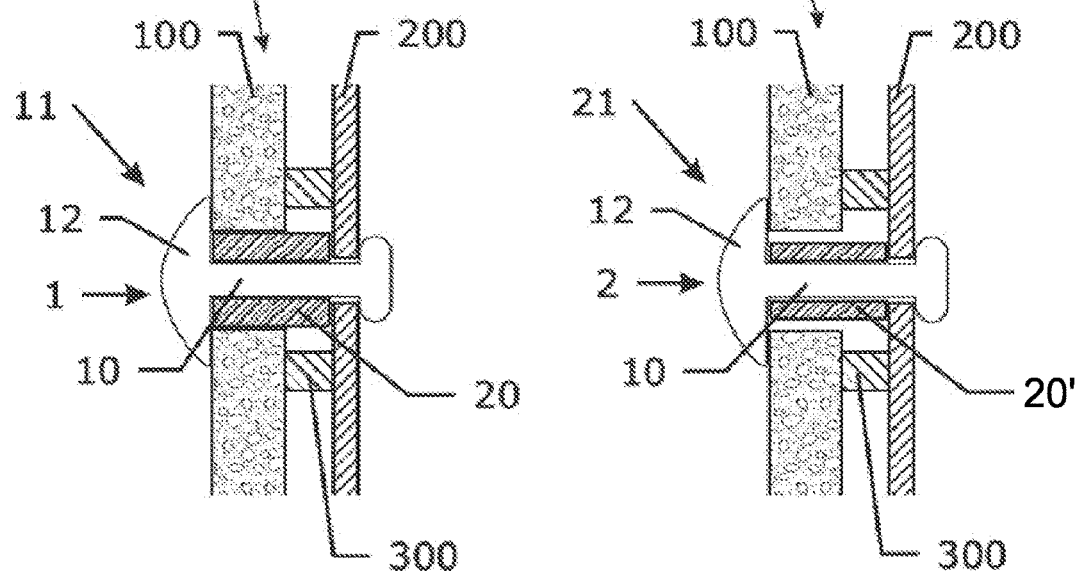

As shown in FIG. 3c, being a detail of the gliding fixing points 21, the rivet 2 is used having a sleeve 20' which is far less thin as the one of rivet 1, and fits easily in the drilled hole on the fiber cement sheet. There is room to allow the drilled hole of the fiber cement sheet to move while the sleeve being positioned in the drilled hole. The metal body of the rivet has a diameter equal or slightly less than the drilled hole in the metal support. On this gliding point 21, the fiber cement sheet will be allowed to move in planar direction of the sheet.

As shown in the particular embodiments of FIGS. 3b and 3c, the polymer tubular member (i.e. sleeve) has a length Lm, which is greater (i.e. longer) than the thickness of cementitious sheet, and an outer diameter, which is larger than the outer diameter of the at least one hole in said support.

In these particular embodiments, a fixed distance is created between the cementitious sheet and the support by means of the polymer tubular member, which fixed distance is equal to the difference between the length of the polymer tubular member and the thickness of the cementitious sheet. Creating such a distance between the sheet and the support allows the occurrence of minor displacements, such as movements, bendings or expansions of the cementitious sheet, e.g. the fiber cement sheet, in the direction perpendicular to the sheet.

In particular embodiments, as also shown in FIGS. 3b and 3c, the present invention provides methods for fixing a cementitious sheet to a support, further comprising the step of providing at least one damping sheet-like object adjacent to the at least one hole in said support, said damping sheet-like object having a thickness T. In these particular embodiments, the thickness T of said damping sheet-like object is equal to or greater than the difference between the length Lm of said polymer tubular member and the thickness of said cementitious sheet.

The presence of such one or more flexible or compressable damping sheet-like objects, provides additional support to maintain the distance between the support and the sheet. Also, the at least one damping sheet-like object provides the advantage that the forces applied at and near the contact points between the rivet sleeve, the cement sheet and the support are more uniformly spread and/or distributed. In this way, potential cracks and damage to the cementitious sheet adjacent to the holes are avoided by somewhat decreasing (by displacement) the forces occurring at these points. Finally, Also, the at least one damping sheet-like object provides the advantage that potential bending movements of the cementitious sheet in the direction perpendicular to the sheet are compensated by compression.

In yet further particular embodiments, the at least one damping sheet-like object is damping ring or a damping strip made out of compressible material, such as a foam-like material, for instance but not limited to poly-urethane.

Other cementitious sheets may be fixed in substantially the same way.

It is to be understood that although preferred embodiments and/or materials have been discussed for providing embodiments according to the present invention, various modifications or changes may be made without departing from the scope and spirit of this invention.

The invention claimed is:
1. A rivet (1) for fixing a cementitious sheet to a support, said rivet (1) comprising:
   a single-piece metal rivet body (10) with an axial length (Lr) and having a metal rivet head (12) and a metal mandrel (14) having a substantially constant outer diameter (Dr), and at least one polymer tubular member (20) having a length (Lm) in an axial direction (30), the length of the tubular member (Lm) being less than the length of the rivet body (Lr), said polymer tubular member (20) being coaxially mounted on said rivet body (10) along its length (Lm) directly against the metal mandrel (14) over the entire length of the tubular member (20) and not extending beyond the metal mandrel (14), wherein:

said length (Lm) of said polymer tubular member (20) is configured to be at least identical or longer than the thickness of said cementitious sheet, the outer diameter of said polymer tubular member (20) is configured to be larger than a diameter of at least one hole in said support, and said outer diameter (Dr) of said mandrel (14) is configured to be less than the diameter of said at least one hole in said support.

2. The rivet (1) of claim 1, wherein the outer diameter of said polymer tubular member (20) is smaller than at least one hole in said cementitious sheet (100), such that both said rivet body (10) and said polymer tubular member (20) extend through said at least one hole in said cementitious sheet (100) when said rivet (1) is inserted into said respective holes in said cementitious sheet (100) and said support (200).

3. A building system, comprising:
at least one rivet (1), a support and a cementitious sheet fixed to said support by at least one rivet (1) inserted into at least one hole in said sheet and into at least one hole in said support, said rivet (1) comprising:
a single-piece metal rivet body (10) with an axial length (Lr) and having a metal rivet head (12) and a metal mandrel (14) having a substantially constant outer diameter (Dr), and
at least one polymer tubular member (20) having a length (Lm) in an axial direction (30), the length of the polymer tubular member (Lm) being less than the length of the rivet body (Lr),
said polymer tubular member (20) being coaxially mounted on said rivet body (10) along its length (Lm) directly against the metal mandrel (14) over the entire length of the tubular member (20) and not extending be the metal mandrel (14), wherein:
said length (Lm) of said polymer tubular member (20) is configured to be at least identical or longer than the thickness of said cementitious sheet,
the outer diameter of said polymer tubular member (20) is configured to be larger than a diameter of at least one hole in said support, and
said outer diameter (Dr) of said mandrel (14) is configured to be less than the diameter of said at least one hole in said support.

4. The building system according to claim 3, wherein the diameter of the at least one hole in said cementitious sheet is greater than the diameter of the at least one hole in said support.

5. The building system according to claim 3, wherein said building system further comprises at least one damping sheet-like object adjacent to the at least one hole in said support, said damping sheet-like object having a thickness (T), which is equal to or greater than the difference between the length (Lm) of said polymer tubular member and the thickness of said cementitious sheet.

6. The building system according to claim 3, wherein the outer diameter of said polymer tubular member (20) is smaller than at least one hole in said cementitious sheet (100), such that both said rivet body (10) and said polymer tubular member (20) extend through said at least one hole in said cementitious sheet (100) when said rivet (1) is inserted into said respective holes in said cementitious sheet (100) and said support (200).

7. A method for fixing a cementitious sheet to a support, comprising the steps of:
(i) providing a support;
(ii) providing a cementitious sheet;
(iii) providing at least one hole in said sheet;
(iv) providing at least one hole in said support; and
(v) fixing said cementitious sheet to said support by inserting a rivet (1) into the at least one hole in said sheet and into the at least one hole in said support, said rivet (1) comprising:
a single-piece metal rivet body (10) with an axial length (Lr) and having a metal rivet head (12) and a metal mandrel (14) having a substantially constant outer diameter (Dr), and
at least one polymer tubular member (20) having a length (Lm) in an axial direction (30), said length (Lm) of said polymer tubular member (20) being less than said length (Lr) of said rivet body (10),
said polymer tubular member (20) being coaxially mounted on said rivet body (10) along its length (Lm) directly against the metal mandrel (14) over the entire length of the tubular member (20) and not extending beyond the metal mandrel (14), and constricting the rivet, thereby fixing the cementitious sheet to the support, wherein:
said length (Lm) of said polymer tubular member (20) is at least identical or longer than the thickness of said cementitious sheet,
the outer diameter of said polymer tubular member (20) is larger than a diameter of at least one hole in said support, and
said outer diameter (Dr) of said mandrel (14) is less than the diameter of said at least one hole in said support.

8. The method according to claim 7, comprising forming the diameter of the at least one hole in said cementitious sheet to be greater than the diameter of the at least one hole in said support.

9. The method according to claim 7, comprising providing the length of the polymer tubular member (Lm) to be more than or equal to about 10 mm and less than or equal to about 15 mm.

10. The method according to claim 7, comprising providing the length of said polymer tubular member to be about 1.5 mm to about 3 mm larger than the thickness of said cementitious sheet.

11. The method according to claim 7, further comprising the step of providing at least one damping sheet-like object adjacent to the at least one hole in said support, said damping sheet-like object having a thickness (T), which is equal to or greater than the difference between the length (Lm) of said polymer tubular member and the thickness of said cementitious sheet.

12. The method according to claim 7, wherein n pairs of holes are provided, n being an integer equal or more than 2, each pair having one hole in the cementitious sheet, and a corresponding hole in the support, said steps of fixing and constricting comprise insertion of and constriction of n rivets into said n pairs of holes, wherein m rivets have a maximum outer diameter of said mandrel and said polymer tubular member together being substantially equal to the diameter of the hole in the cementitious sheet, and wherein n-m rivets have the maximum outer diameter smaller than the diameter of the hole in the cementitious sheet.

13. The method according to claim 7, comprising providing said polymer tubular member from a polymer selected from the group consisting of polyamide, polyester, polyvinylchloride, polypropylene, polyethylene and copolymers thereof.

14. The method according to claim 7, comprising providing said polymer tubular member to have a wall thickness (Dw) of more than or equal to about 1 mm and less than or equal to about 8 mm.

15. The method according to claim 7, comprising providing an inner diameter of an opening of the polymer tubular member (Dm) to be more than or equal to about 4 mm and less than or equal to about 5.5 mm.

16. The method according to claim 7, wherein said cementitious sheet is a fiber cement sheet.

17. The method according to claim 7, wherein the outer diameter of said polymer tubular member (20) is smaller than the at least one hole in said cementitious sheet (100), such that both said rivet body (10) and said polymer tubular member (20) extend through said at least one hole in said cementitious sheet (100) when said rivet (1) is inserted into said respective holes in said cementitious sheet (100) and said support (200).

* * * * *